Aug. 12, 1930.                G. C. CHASE                1,773,026
              CARRIAGE SHIFTING MECHANISM FOR CALCULATORS
                  Filed Oct 15, 1927        7 Sheets-Sheet 1

Inventor
Geo. C. Chase
E. W. Anderson son.

By

Attorney

Aug. 12, 1930.  G. C. CHASE  1,773,026

CARRIAGE SHIFTING MECHANISM FOR CALCULATORS

Filed Oct. 15, 1927  7 Sheets-Sheet 2

Inventor
Geo. C. Chase
By  E. W. Anderson

Attorney

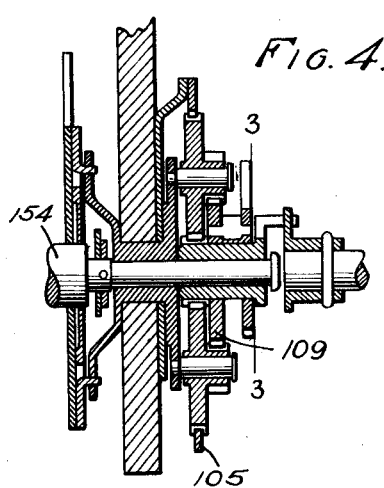
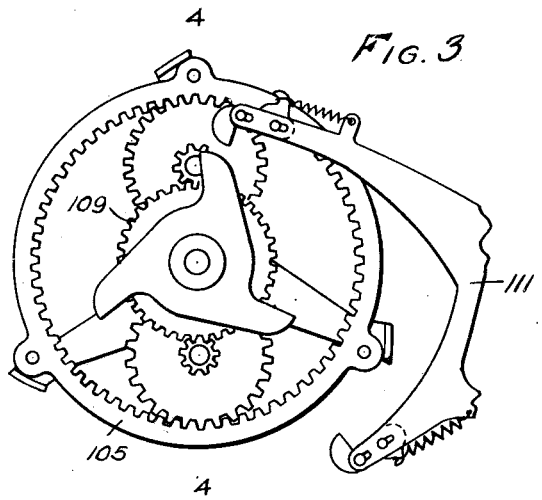
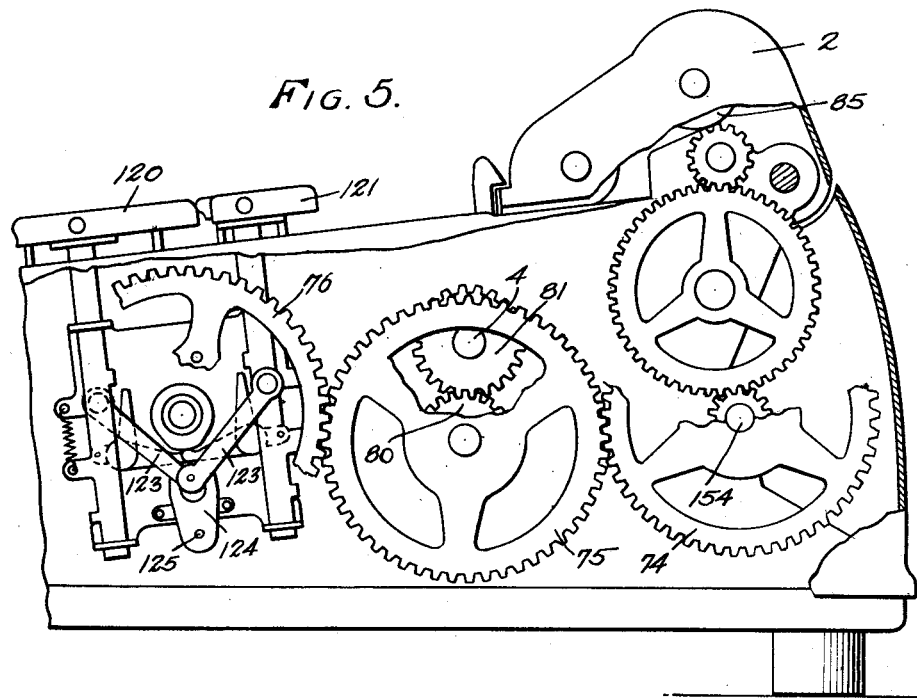

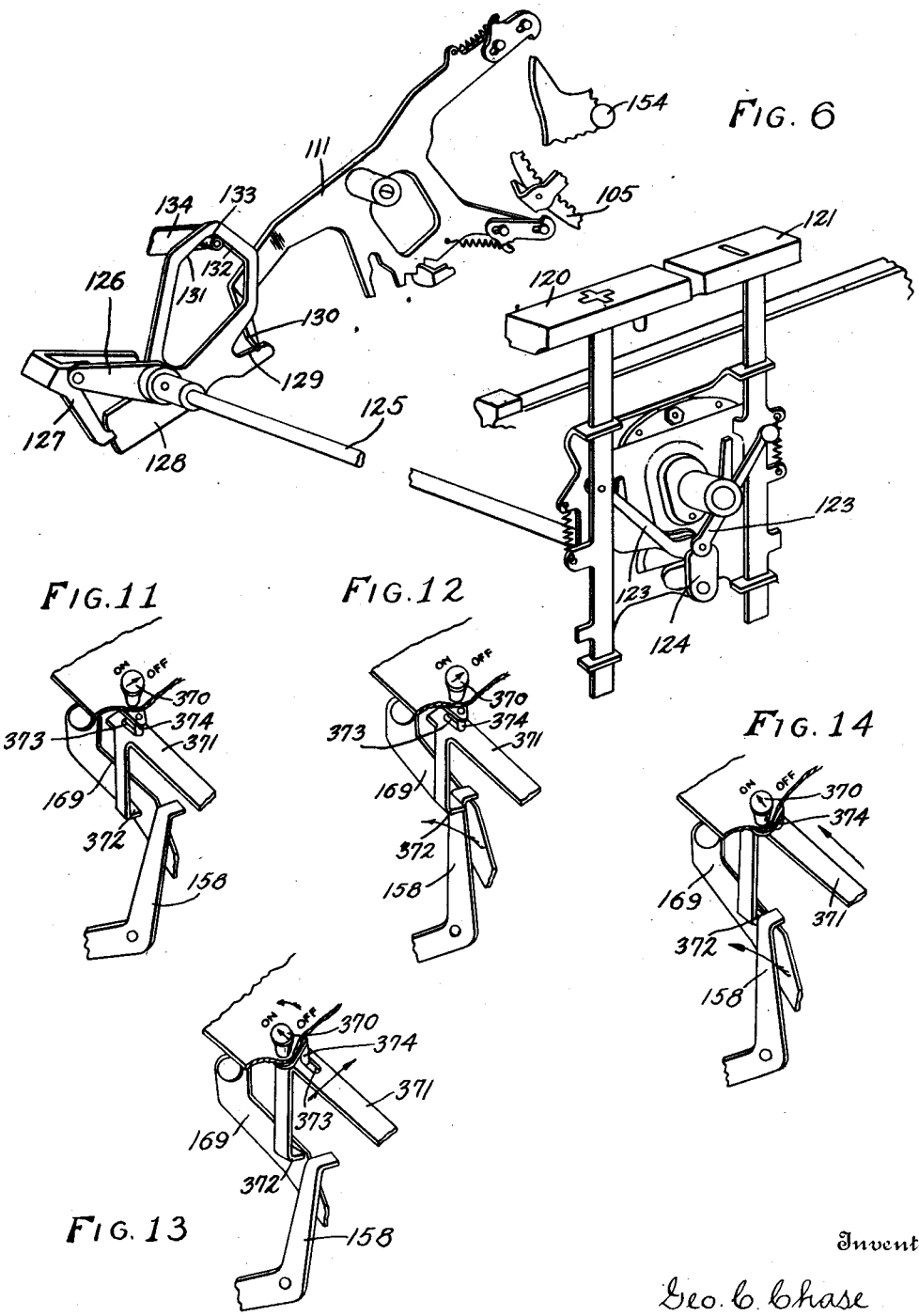

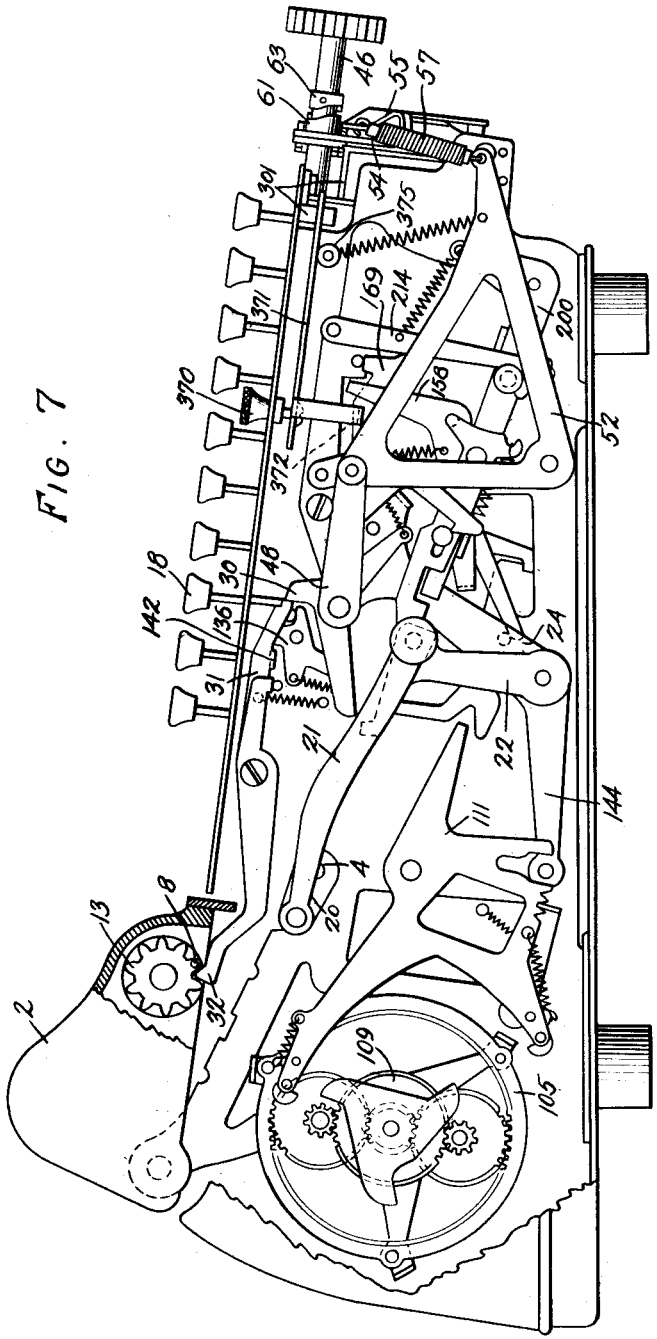

Aug. 12, 1930. G. C. CHASE 1,773,026
CARRIAGE SHIFTING MECHANISM FOR CALCULATORS
Filed Oct. 15, 1927 7 Sheets-Sheet 6

Inventor
Geo. C. Chase
By G. W. Anderson Jr.
Attorney

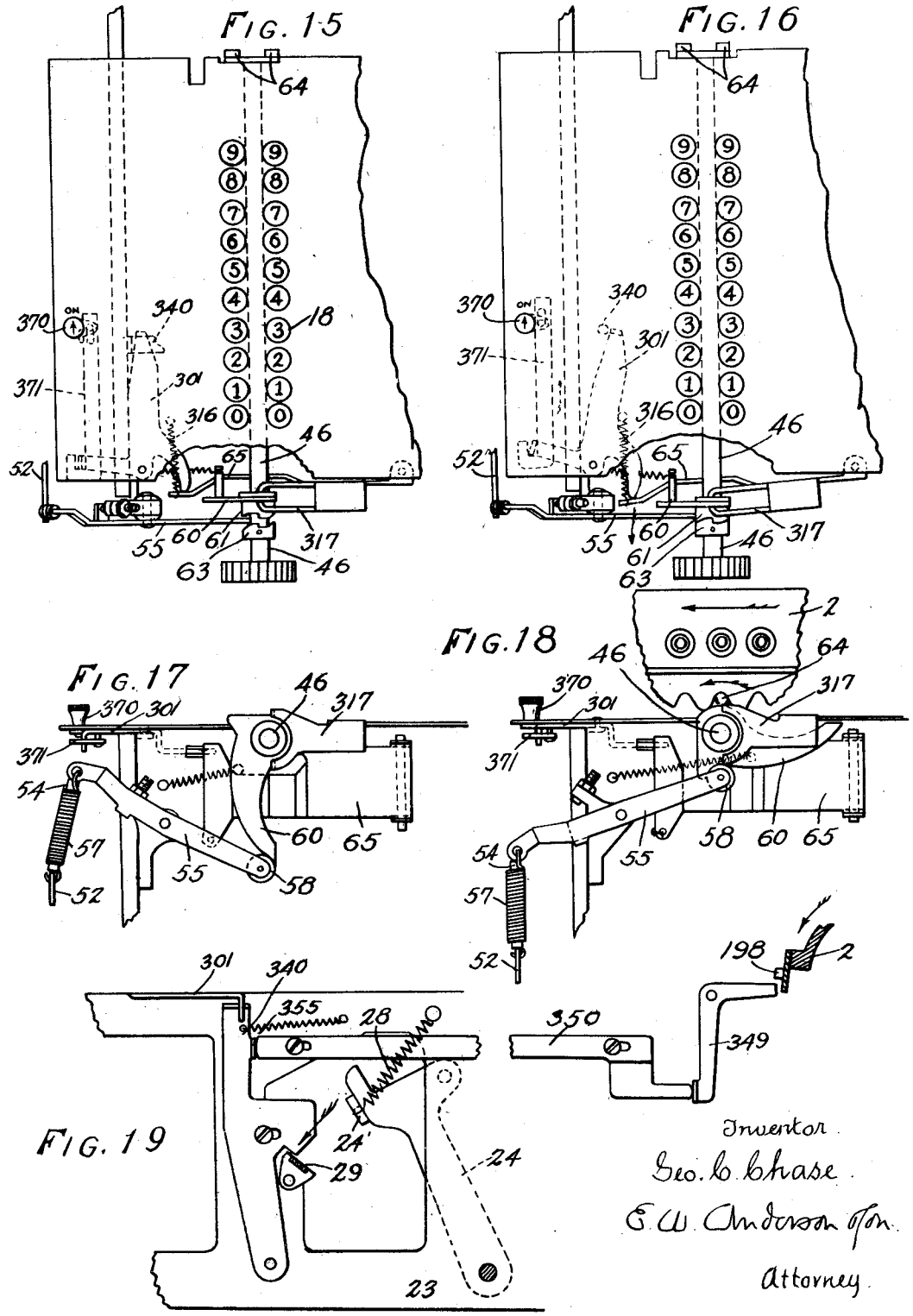

Patented Aug. 12, 1930

1,773,026

UNITED STATES PATENT OFFICE

GEORGE C. CHASE, OF SOUTH ORANGE, NEW JERSEY, ASSIGNOR TO MONROE CALCULATING MACHINE COMPANY, OF ORANGE, NEW JERSEY, A CORPORATION OF DELAWARE

CARRIAGE-SHIFTING MECHANISM FOR CALCULATORS

Application filed October 15, 1927. Serial No. 226,418.

The invention has relation to means whereby the numeral wheel carriage of a calculating machine may be shifted laterally in an automatic manner to accomplish multiplication and division according to the well known methods.

An object of the invention is to provide carriage shifting mechanism which will respond to manipulation of positive and negative motor control keys. Another object of the invention is the provision of shifting mechanism operable upon an overrun of the carry mechanism of the register in either direction of rotation. Another object is the provision of a carriage shift which will permit the use of a simplified method of division in a reversible cycle machine. Other objects and advantages will hereinafter appear.

The invention consists in the novel construction and combinations of parts as set forth in the appended claims.

In the accompanying drawings, illustrating the invention:

Figure 3 is a sectional view, taken on the line 3—3 of Fig. 4;

Figure 4 is a sectional view, taken on the line 4—4 of Fig. 3;

Figure 5 is a partial right side view of the machine, with casing broken away, showing the driving gears and operating key mechanism;

Figure 6 is a perspective view showing the connections between the operating keys and clutch mechanism;

Figure 7 is a left side view of the machine, with the casing broken away;

Figure 11 is a detail perspective view, showing the parts effecting the engagement of the carriage shift clutch in neutral position;

Figure 12 is a similar view to Fig. 11, with the parts in position shown in Fig. 10;

Figure 13 is a similar view to Fig. 11, with the parts in position shown in Fig. 7;

Figure 14 is a similar view to Fig. 11, with the parts in position shown in Fig. 8;

Figure 15 is a plan view showing the carriage shift clutch mechanism in neutral position;

Figure 16 is a similar view to Fig. 15, showing the carriage shift clutch engaged;

Figure 17 is a front view of parts shown in Fig. 16, with the carriage shift cam in neutral position;

Figure 18 is a similar view to Fig. 17, showing the cam rotated 90° and the carriage advanced a half step to the left;

Figure 19 is a detail side view, showing the parts which effect the release of the carriage shift clutch latch.

Figure 1:
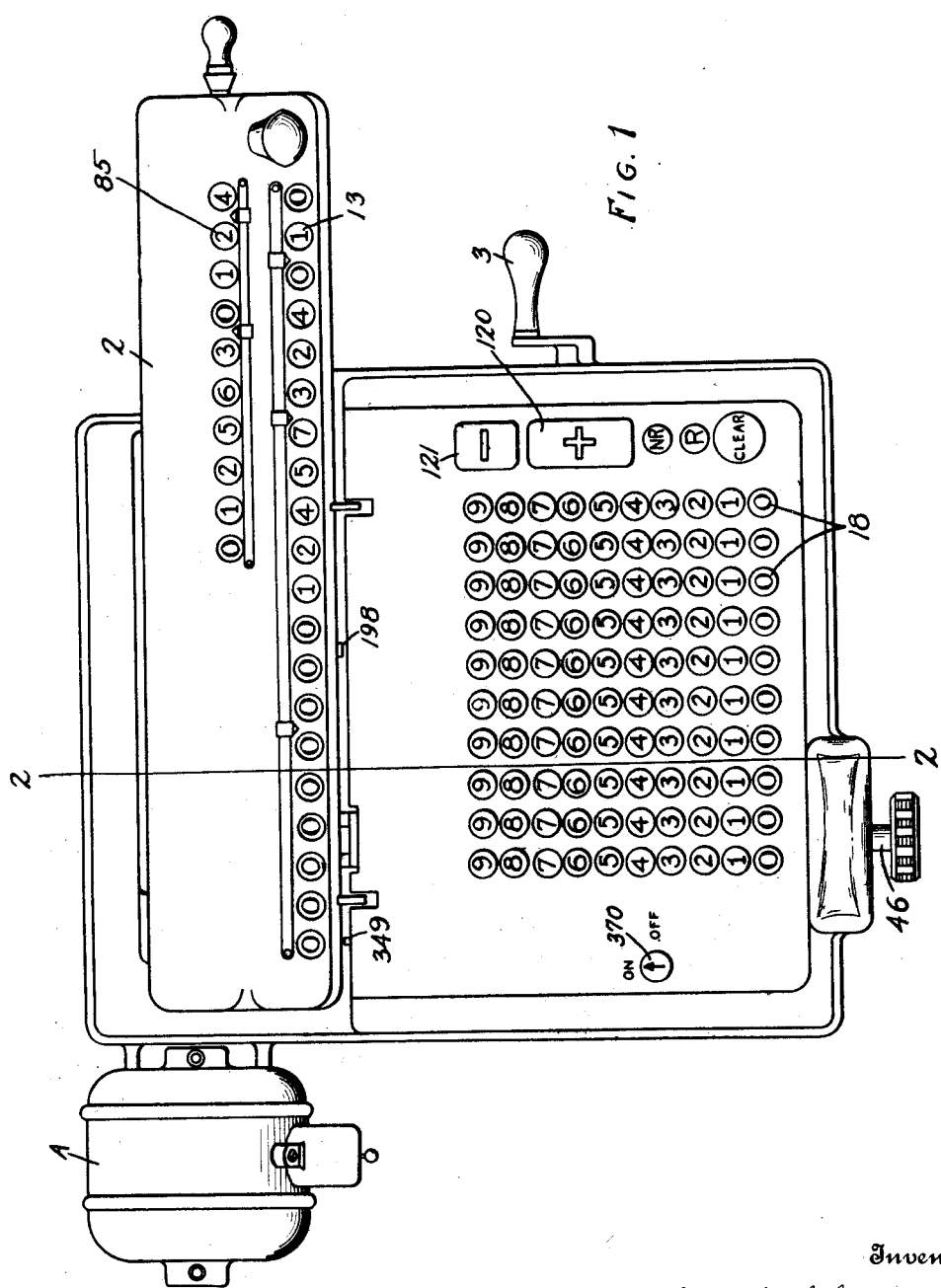
Figure 1 is a plan view of a calculating machine, embodying the invention.
Figure 2:
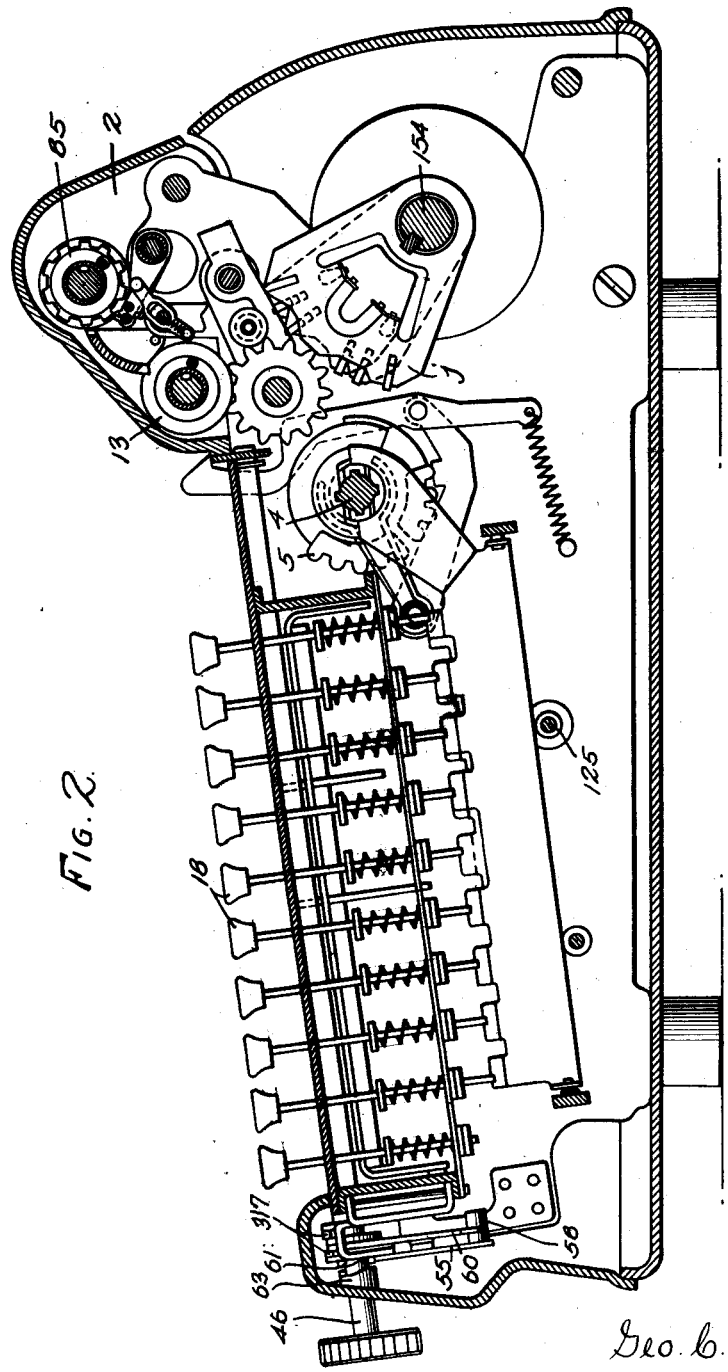
Figure 2 is a sectional view, taken on the line 2—2 of Fig. 1.

In these drawings the invention is shown as applied to a reversible cycle calculating machine constructed in accordance with the disclosure of Patent No. 1,566,650, issued to George C. Chase, December 22, 1925, as modified by the structure illustrated in the Patent No. 1,504,741, for counting wheel carry mechanism, dated August 12, 1924, and application Serial No. 223,708, for carriage shift control for calculating machines, filed October 3, 1927.

Registering means—Figs. 1–7

According to the present disclosure, and as more fully set forth in the patent first above referred to, amounts set up on the keyboard 18 and thereby on the differential actuating gears 5 (Fig. 2) are registered upon numeral wheels 13 by the operating of the differential gear shaft 4 and shaft 154 whereon the tens carry members are mounted, these shafts being connected by a train of one-to-one ratio gearing 74, 75, 80, 81 (Fig. 5). The hand crank 3, operating a gear 76, meshing with gear 75 of said train, is retained herein as an alternative means of operation, electric motor A being however the preferred means of operation.

Numeral wheels 13 and quotient wheels 85 are mounted in a transversely shiftable carriage 2, which carriage is adjusted laterally to facilitate operations in multiplication and division. The quotient wheels 85 are operated in accordance with the disclosure of Patent No. 1,504,741, hereinbefore referred to; being equipped with carry mechanism, and being operated to register positively during negative registration upon the wheels 13 and to register negatively during positive registrations upon the wheels 13.

The motor driving means illustrated is substantially the same as that disclosed in the first named Chase patent, motor A having driving connection with a planetary gear mechanism, the gear members 105 and 109 of which normally rotate idly but may be selectively arrested by means of the reversing clutch lever 111, to drive the third member of the differential, connected with carry shaft 154, forwardly or reversely, respectively.

Motor operation is controlled by means of an add key 120 and a subtract key 121 (Figs. 1, 5 and 6), each having link engagement 123 with an arm 124 of rock shaft 125, said shaft having at its opposite end an arm 126 connected with a setting lever 128 by means of coupling 127. Lever 128 is provided with a recess 129, between the walls of which lies a lug 130 of reversing clutch lever 111. Depression of the add or subtract key will therefore rock lever 111 in the one or the other direction and effect additive or subtractive operation of the machine. Before the clutch is engaged the movement of lever 128 will unlock the actuating mechanism of the machine in the following manner: Oppositely inclined cam faces 131 and 132 of setting lever 128 (Fig. 6) are adapted to depress an anti-friction roller 133, mounted upon the rearward arm of releasing lever 134. The forward arm of lever 134 is provided with a depending pivoted link 214 having an angularly disposed or hook end 215, lying beneath pin 216 of a lock lever 200, so that rocking movement of lever 134 will raise lever 200 out of locking engagement with the end of link 21 of rock arm 22, hereinafter described.

Movement of lever 128 upon depression of the add or the subtract key will also set a member in position to trip the trigger 31 upon release of such key, so that at the end of a cycle suitable mechanism will be brought into action to bring the actuating mechanism to rest in full cycle position.

This member comprises releasing pawl 136, pivotally mounted upon releasing lever 134 and having an arm normally lying in front of the forward edge of lug 142 of trigger lever 31. When roller 133 of lever 134 is depressed, the arm of pawl 136 is disengaged from lug 142 and the pawl spring member will bring said arm to position beneath the lug. When the add or subtract key is released by the operator, spring 203 tends to restore releasing lever 134 to normal position, the completion of the movement being insured by a spring pressed arm 169 of lever 134, tensioned by contact therewith of a lever 158, positioned by rock arm 22. As lever 134 is restored the arm of pawl 136 will contact with the lower face of lug 142 and lift trigger 31 from engagement with a lug 30 of stop element 25, pivotally mounted upon arm 24, the latter being rotated by a spring into position for engagement with shoulder 27 of rock arm 22. Arm 22 is connected to the shaft 4 of the differential actuating members 5, by link 21 and crank arm 20 of said shaft. Upon movement of crank arm 20 to dead center position, stop element 25 will drop into engagement with shoulder 27 and in the following rotation of the parts arm 24 will be carried forwardly with arm 22 until a suitable lug of the former arm is brought into contact with a stationary stop member 29. During this movement of arm 24 a pin 145 mounted upon a rearward extension 144 of said arm will engage one of the oppositely inclined cam faces 147 of reversing clutch lever 111 to move the latter to neutral position, whereby the actuating mechanism is released by the action of the motor. Arm 24 having contacted with stop 29, the rebound of the parts and the action of spring 28 will restore crank arm 20 to dead center position, restoring stop element 25 to restrained position and locking the actuating mechanism by means of lever 200.

It will be evident from the above that addition and subtraction are performed by a momentary depression of the corresponding key. Multiplication is performed by holding down add key 120 until a number of cycles of operation have been made corresponding to the value of the figure of the multiplier. In division, quotient figures may be automatically determined by the aid of devices operated upon by the overrun of the carry mechanism, as follows: The divisor set up on the keyboard 18 is subtracted from the dividend registered on the numeral wheels 13 once more than the number of times said divisor is contained in the corresponding portion of the dividend, a negative numeral reading resulting and the carry over mechanism of the machine providing for the registration of a series of nines upon numeral wheels 13 as far to the left as such carry over mechanism is provided. In other words, a transitional carry has occurred. This carry is utilized to stop the machine by means of a cam projection 32 of the rearwardly extending arm of trigger 31, said cam projection lying in the path of movement of the carry pin $q$ of the numeral wheel 13 associated at the time with the highest order carry mechanism. Upon tripping of the stop member 25 the machine will be allowed to come to rest notwithstanding continued depression of the key, by the tripping of the coupling 127, as described in the Chase operating means patent hereinbefore referred to. The numeral wheel carriage will be shifted automatically to the left, by the means hereinafter described, whereby the remainder registered upon the wheels 13 will be multiplied by ten. The operator will now release the subtract key and depress the add key 120. When the accumulations result in a carry over, the left hand numeral wheels will move from 9 to 0 registration, giving a transition from negative to positive reading, the lacking registration being thus restored and the correct remainder for the first two quotient figures registered on the wheels 13. At the same time this additive operation will, by a subtractive carry action of the wheels 85, correct the excessive first quotient figure, the second quotient figure registration being also correctly registered. The second transitional carry, above described, will also operate trigger 31 and again stop the machine and shift the carriage to the left.

For example, to divide 144 by 18, set the number 144 in the accumulator wheels, clear the counting wheels and set 18 in the keyboard, in line with the figures 14 on the accumulator wheels. Upon depression of the subtract key, 18 will be subtracted from 14, giving an accumulator wheel reading of 99964 and a counting wheel reading of 1. The carriage will now be automatically shifted, so that the amount 18 in the keyboard will be in line with the figures 64 in the accumulator wheels and so that the counting wheels will read 10. Upon depression of the add key, 36 (twice 18) will be added to 99964 in the accumulator wheels, and 2 will be subtracted from 10 in the counting wheels, whereupon the machine will be stopped with the correct remainder (00000) and the correct quotient (8) appearing in the accumulator wheels and in the counting wheels respectively.

| Accumulator wheels | Counting wheels | |
|---|---|---|
| 00144<br>−18 | 00<br>+1 | Original registration. |
| 99964<br>+36 | 10<br>−2 | After first operation. |
| 00000 | 8 | After second operation. |

Figure 8:
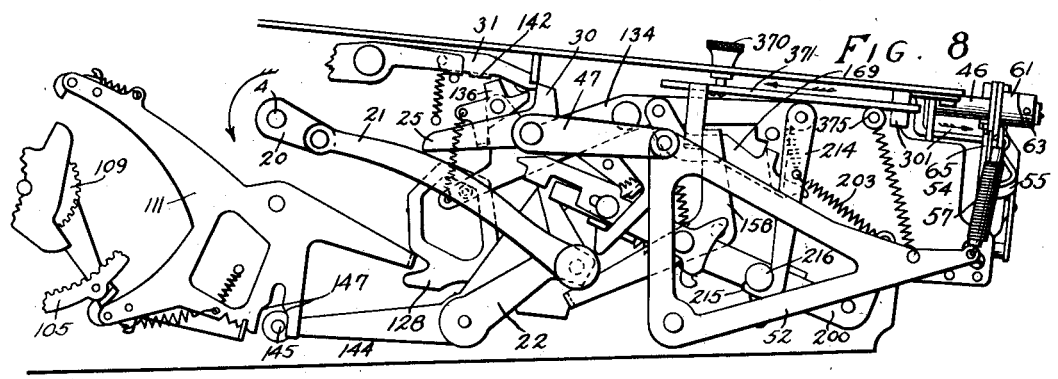
Figure 8 is a detail left side view of the machine, showing parts in position assumed when the plus bar is depressed, the actuators in mid-cycle position, and the carriage shift mechanism in operative position.
Figure 9:
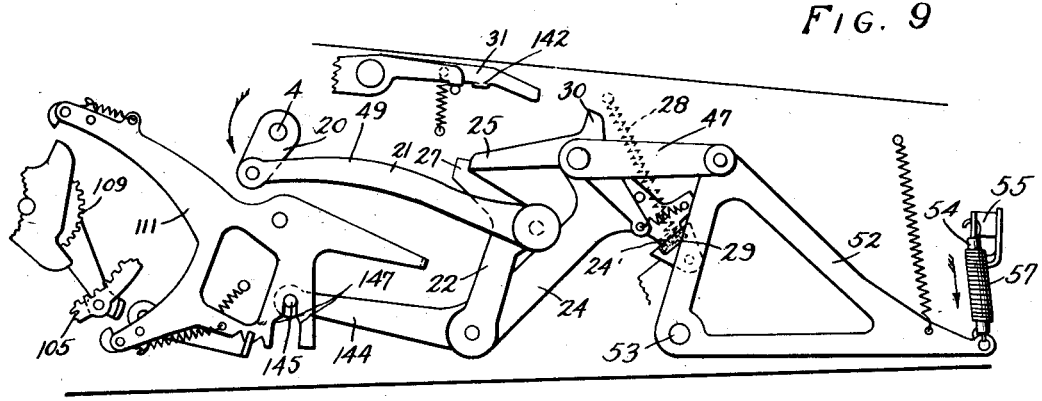
Figure 9 is a detail left side view of the machine showing the carriage shift parts in position assumed at the end of an extra-cyclic movement.
Figure 10:
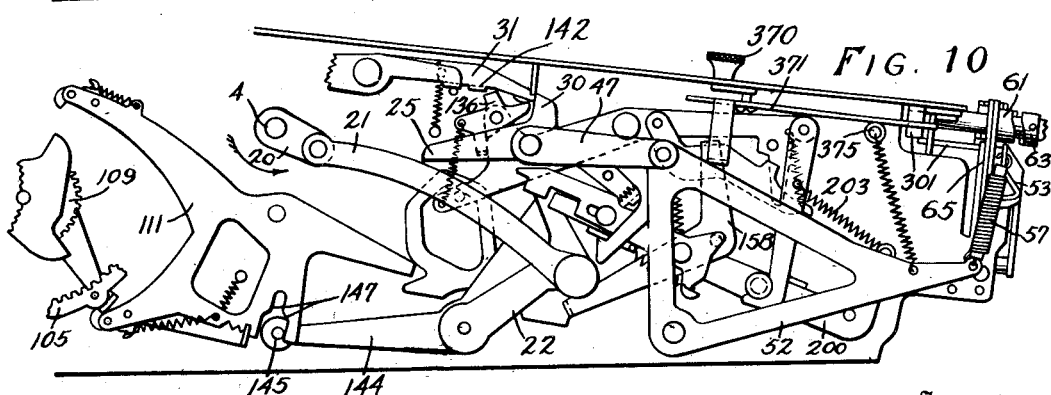
Figure 10 is a similar view to Fig. 8, with the carriage shift mechanism in inoperative position.

*Automatic carriage shift—Figs. 8 19*

In performing addition and subtraction the numeral wheel carriage will usually be retained in the same position, while in multiplication and division the shifting of the carriage is necessary, and in order to provide for an automatic shifting in the latter operations means are provided whereby shaft 46, having the opposite crank pins 64 engaging serrations of a rack located on the forward edge of the carriage, may be rotated by power derived from the motor A, transmitted through the operation of arm 24 of the full cycle stop mechanism.

Lever 52 is fulcrumed at 53 to the framing, is connected to arm 24 by link 47, and at its forward end is connected with an arm of carriage shifting lever 55 by means of spring 57 and spacer rod 54. The other arm of carriage shifting lever 55 is provided at its free end with a roller 58, adapted to operate against carriage shifting cam 60, loosely mounted on shaft 46 and having a toothed hub clutch member 61, adapted for engagement with the teeth of the complementary opposite clutch member 63, fast upon shaft 46.

When clutch members 61 and 63 are in engagement, therefore, movement of arm 24 during a stopping operation following release of the add or subtract key will operate bell lever 52 to tension spring 57. Spring 57 in its elongation stores energy and utilizes the same more slowly in its operation of the carriage shifting lever 55. As roller 58 of the carriage shifting lever is carried upward, cam 60 is rotated about 90° counterclockwise, as viewed in Figure 18, thereby raising the carriage and advancing it about one half of its step movement to the left. The momentum of the carriage and the force of gravity acting thereon is sufficient to complete its one step of movement.

In order that the operator may control the shifting of the numeral wheel carriage, so that said carriage may shift or remain undisturbed, according to the operation being performed, the following means are provided for controlling and operating the clutch 61, 63:

The lever 158 hereinbefore referred to is actuated during each rotation of the machine, and a bar 371 is located beneath the keyboard plate and provided at its rear end with an extension having a lug 372 adapted to be brought into the path of movement of lever 158. The rearward end of bar 371 is also provided with a slot 373 engaged by a crank pin 374 of the adjusting knob 370, the bar being supported upon an enlarged head of the crank pin and upon a pin 375 of the framing. When knob 370 is turned to the position illustrated in Figure 13, bar 371 will pivot upon its forward connection to be described, and will be so adjusted that upon operation of the machine lever 158 will pass inside lug 372 without engagement. When however, knob 370 is turned to the position shown in Figure 14, lever 158 will contact with lug 372 and bar 371 will be moved rearwardly. The forward end of bar 371 is provided with a slot engaging an arm of clutch shift lever 301 (Figs. 15, 16, 7, 8, 10), so that as the bar is moved rearwardly lever 301 is rocked, and a forwardly extending arm thereof pushes against pivoted plate 65, having a shipper arm 317 engaging clutch hub 61, the movement described serving to engage said clutch hub with the clutch member 63. Clutch shift lever 301 is provided with a latch arm, adapted to engage latch 340 when the lever is moved to clutch engaging position.

It will thus be seen that the position of adjusting knob 370 will determine whether, upon operation of the machine, the carriage shifting clutch will be engaged or left disengaged, and whether the carriage will be shifted or left unshifted at the end of the operation.

At the end of the operation, the full-cycle stopping means will be operated, whereupon the carriage shift impulse will be imparted, as previously described, and arm 24 will contact with and release latch 340, so that upon a succeeding operation of the machine the carriage will shift or remain idle, according to the setting of knob 370.

When the numeral wheel carriage 2 has been shifted to its extreme left hand position, the following means will prevent the occurrence of a further carriage shifting impulse: A pin 198 on the forward edge of the carriage is adapted when the carriage descends into its extreme position to contact with and rock a bell lever 349 fulcrumed in the framing of the machine. Slide 350 lies between bell lever 349 and latch 340 and as bell lever 349 is rocked serves to move said latch out of engagement with the clutch shifting lever 301, whereupon spring 316 attached to the plate 65 will shift the clutch out of engagement. Since lever 158 and arm 24 of the full cycle stopping mechanism are actuated at different times, and since latch 340 can not be engaged while the carriage lies in extreme left hand position, the movement of lever 158 will now be idle, and no shifting impulse will occur, even though the adjusting knob 370 is set to shifting position.

Operation

Addition and subtraction are performed as hereinbefore described with adjusting knob 370 set to "off" or non-shifting position.

In multiplication the carriage should be set over to the right a number of places at least equal to the number of places contained in the multiplier. Knob 370 is placed in "on" or carriage shifting position, and the multiplication is started with the highest order figure of the multiplier, by holding down add key 120 for the correct number of cycles. Upon release of the add key the machine will stop and the carriage will be shifted one step toward the left. The operation is repeated until the complete product is registered.

The well-known method of shortcutting multiplication may also be employed on this machine to great advantage. For instance, if it is desired to multiply by 271, the carriage being placed in the proper position for multiplication by hundreds, the plus bar is held down to give three revolutions of the actuating mechanism. Upon release of the plus bar, the carriage is automatically shifted into the proper relation for multiplication by tens, and the minus bar is now held down to give three revolutions to the actuating mechanism. This will subtract from the excessive hundred registration and make the product a multiplication by 270. As the minus bar is released, the carriage will again shift automatically, whereupon the plus bar is touched and the final multiplication by one performed.

In division the carriage may be set as desired, preferably as far to the right as possible. With knob 370 in "off" position the dividend is transferred from the keyboard 18 to the numeral wheels 13 by depression of add key 120. The wheels 85 are now cleared, the divisor is set up on the keyboard and knob 370 is set to "on" position. Subtract key 121 is held depressed until the machine stops, and the carriage shifts automatically to the left, whereupon the add key is depressed and held until the machine stops and the carriage shifts to the left. The subtract and add keys are alternately operated until the division has been carried a sufficient number of places, whereupon, if the subtract key has been last operated, a single corrective additive rotation is made in the last registering position of the carriage. If this last registering position has been the extreme left hand position of the carriage the automatic disconnection of the shifting clutch will leave the carriage in position for the corrective addition, but in other positions the carriage may be manually returned to last position or the knob 370 turned to "off" position before the last registration is made.

I claim :—

1. In a calculating machine having a transversely shiftable carriage, numeral wheels thereon, actuating mechanism for said numeral wheels, and motor drive means for said actuating mechanism, motor drive control mechanism including a plus registration key and a minus registration key, and means responsive to manual release of the operated plus and the operated minus registration key to bring the actuating mechanism to rest and to shift the numeral wheel carriage.

2. In a calculating machine having a transversely shiftable carriage, numeral wheels thereon, actuating mechanism for said numeral wheels having a reversible cycle of operation, motor drive means, and a clutch between said drive means and said actuating mechanism, motor drive control mechanism including means for engaging and disengaging the clutch, means operable automatically upon disengagement of the clutch during forward and during reverse operation to bring the released actuating means to rest in full-cycle position and to shift said carriage.

3. In a calculating machine having a transversely shiftable carriage, numeral wheels thereon, means including differential actuating members for registering values on said numeral wheels, means controlled by the numeral wheels for stopping said actuating members in full-cycle position, and carriage shifting means; means settable to adjust the carriage shifting means to operate invariably with the stopping means.

4. In a calculating machine having a transversely shiftable carriage, numeral wheels thereon, means including differential actuating members for registering values on said numeral wheels, and means for stopping said actuating members in full-cycle position, carriage shifting means comprising a train of mechanism connected to the stopping means, a train of mechanism engaging the carriage, a clutch connection between said trains, and settable means for controlling said clutch.

5. In a calculating machine having a transversely shiftable carriage, numeral wheels thereon, actuating mechanism for said numeral wheels, motor drive means for said actuating mechanism, motor drive control mechanism including a plus registration key and a minus registration key, means responsive to manual release of the operated plus or minus registration key to bring the actuating mechanism to rest, and carriage shifting means; means manipulable to render said carriage shifting means responsive to said manual release.

6. In a calculating machine having a transversely shiftable carriage, numeral wheels thereon, reversible actuating mechanism for said numeral wheels and motor drive means for said actuating mechanism; a train of mechanism between said motor drive means and said carriage, adapted to shift the carriage in an invariable direction and including a device adjustable by a single movement to determine automatic operation of said train at the conclusion of forward or reverse operation of said actuating mechanism.

7. In a calculating machine having a transversely shiftable carriage, numeral wheels thereon, reversible actuating mechanism for said numeral wheels, motor drive means, a clutch between said drive means and said actuating mechanism, means operable to disengage the clutch and arrest continued movement of the released actuating mechanism in one or in the other direction, and carriage shifting means; control means settable to adjust the carriage shifting means to operate invariably with the arresting means.

8. In a calculating machine having a transversely shiftable carriage, reversible numeral wheels thereon, and reversible actuating mechanism for said numeral wheels; carriage shifting means including one-way devices operable to effect the shift by an impulse transmitted by said reversible actuating mechanism upon movement of a numeral wheel forwardly to and upon movement of a numeral wheel reversely from zero-registering position.

9. In a calculating machine having a transversely shiftable carriage, numeral wheels thereon, actuating mechanism for said numeral wheels, and motor drive means for said actuating mechanism; motor drive control mechanism including a plus registration key, and a minus registration key, means normally responsive to manual release of the operated plus and the operated minus registration keys to shift the numeral wheel carriage and to bring the actuating mechanism to rest, and means for rendering said last named means responsive to key-controlled movement of a numeral wheel forwardly to and to key-controlled movement of a numeral wheel reversely from zero-registering position.

In testimony whereof I affix my signature.

GEORGE C. CHASE.